Patented Sept. 25, 1934

1,975,012

UNITED STATES PATENT OFFICE 1,975,012

METHOD OF HERMETICALLY SEALING FOOD PRODUCTS IN METAL CONTAINERS

Ronald B. McKinnis, Pittsburgh, Pa., assignor to Continental Can Company, Inc., New York, N. Y., a corporation of New York No Drawing. Application July 21, 1932, Serial No. 623,912

4 Claims. (Cl. 99—8)

The invention relates to new and useful improvements in a method of sealing food products in a metal container, and more particularly to a method of removing oxygen from the food product and container prior to the sealing of the same. It is well known that oxygen has a deleterious action on vitamins and on the flavor and color of vegetables and fruits, and also has a corrosive action on the tin plate forming the containers.

It has been a common expedient to pass a container with the food product therein through an exhaust box for the purpose of heating the food product, excluding the air from the container and creating a vacuum therein after the container is sealed and the food product is cooled. It has also been a common expedient to pass the container with the food product therein into a vacuum chamber for removing the air from the container and then sealing the container while in the vacuum chamber. Both of these methods are inefficient in the removing of the oxygen from the container. If a very high degree of vacuum is obtained, the container is subject to strain, causing buckling or paneling of the container wall.

An object of the present invention is to provide a method of removing the oxygen from the container and the food product more efficiently than has heretofore been accomplished and at the same time leaving said container when sealed free from excessive strain incident to the sealing of the container under a high degree of vacuum.

Another object of the invention is to provide a method of removing occluded, absorbed and adsorbed gases from containers and the product therein.

A still further object of the invention is to provide a method of the above type wherein the food product is sterilized during the removing of the gases and subsequent to the sealing of the container.

The improved method consists in placing the food product in the container in which it is to be sealed, and drawing thereon a vacuum of a very high degree. The vacuum in the container is then replaced by de-oxygenated steam, preferably dry, at a pressure depending upon the heat desired to impart, and the moisture which is permissible to condense on the product. The steam enters the food product and opens the cells thereof. The container is then subjected to a second vacuumization which draws from the container and the food product oxygen along with steam and water vapor. The vacuum is again relieved with de-oxygenated steam, either dry or wet. A non-oxidizing gas, such as carbon dioxide, may be mixed with the de-oxygenated dry steam. The amount of gas to be used depends upon the degree of vacuum which it is desired to obtain in the sealed container. The more inert gas used with the de-oxygenated steam the less will be the resulting vacuum. The container after treatment to the de-oxygenated steam and gas mixture is then immediately sealed before the contents cool.

The treatment of the food product with dry de-oxygenated steam greatly facilitates removing of the oxygen from the food product and the steam forcibly entering the container quickly and more efficiently relieves the container so that it may be sealed substantially free from any oxygen therein. The number of cycles of vacuum and steam treatment will be varied to suit the product, but for most products the two cycle treatment is sufficient. For moist products the steam should not be applied in sufficient amount to introduce more than the allowed amount of moisture. The moisture condensed on the food product can be controlled by the degree of vacuum on the system, or by heating the container and contents thereof externally so as to prevent condensation of the steam at the pressure at which it is applied to the product. The food may or may not be heated previous to the placing of the same in the container, and the containers may or may not have lids loosely clinched thereto before subjecting the same to the vacuum, steam and gassing process.

While it is preferred to replace the vacuum with de-oxygenated steam or a non-oxidizing gas before sealing, it will be understood that from certain aspects of the invention the container may be closed in vacuum. It is essential that the container be closed when it is freed from oxygen. It will also be obvious that from certain aspects of the invention the vacuum may be replaced before sealing with the dry de-oxygenated steam only, or it may be replaced by the non-oxidizing gas only.

The method described above may also be used for removing occluded, absorbed and adsorbed gases from the containers and the products therein. Coffee, for example, contains a gas which is a hindrance in the packaging of the coffee. There are other food products from which it is desirous of removing occluded gases which are deleterious to the actual preservation of the material. It is not easy to remove gases of this character merely by drawing a vacuum on a container and replacing the vacuum with an inert gas. When, however, the de-oxygenated steam is used to relieve the vacuum, this greatly aids in the removing of gas from the interstices of the food particles.

Then again, the de-oxygenated steam, when used to replace the vacuum, may be heated to a sufficient temperature for sterilizing the food product where it contacts with the same and this, together with the removing of the oxygen from the food product and the container greatly aids in the preservation of the food product in the hermetically sealed containers.

It is obvious, therefore, that changes in the steps of the method as specifically described may be made without departing from the spirit of the invention as set forth in the appended claims.

Having thus fully described my invention, what I claim as new and desire to secure by Letters Patent, is:—

1. The method of hermetically sealing food products in metal containers consisting in placing the food product in the container, creating a vacuum within said container for removing oxygen from the food product and the container, replacing the vacuum in the container with de-oxygenated steam and again creating a vacuum within the container for removing more oxygen along with steam and water vapor from the food product and the container and hermetically sealing the container.

2. The method of hermetically sealing food products in metal containers consisting in placing the food product in the container, creating a vacuum within said container for removing oxygen from the food product and the container, replacing the vacuum in the container with de-oxygenated steam and again creating a vacuum within the container for removing more oxygen along with steam and water vapor from the food product and the container, replacing the vacuum in the container with dry de-oxygenated steam, and hermetically sealing the container.

3. The method of hermetically sealing food products in metal containers consisting in placing the food product in the container, creating a vacuum within said container for removing oxygen from the food product and the container, replacing the vacuum in the container with de-oxygenated steam and again creating a vacuum within the container for removing more oxygen along with steam and water vapor from the food product and the container, replacing the vacuum in the container with non-oxidizing gas and hermetically sealing the container.

4. The method of hermetically sealing food products in metal containers consisting in placing the food product in the container, creating a vacuum within said container for removing oxygen from the food product and the container, replacing the vacuum in the container with de-oxygenated steam and again creating a vacuum within the container for removing more oxygen along with steam and water vapor from the food product and the container, replacing the vacuum in the container with a mixture of dry, de-oxygenated steam and a non-oxidizing gas and hermetically sealing the container.

RONALD B. McKINNIS.